United States Patent
Clarke et al.

(10) Patent No.: US 10,538,388 B2
(45) Date of Patent: Jan. 21, 2020

(54) SYSTEM AND METHOD FOR CONFIGURATION OF BUILDINGS OR STORAGE

(71) Applicant: Ocado Innovation Limited, Hertfordshire (GB)

(72) Inventors: Paul Clarke, Hertfordshire (GB); Lars Sverker Ture Lindbo, Hertfordshire (GB); Andrew John Ingram-Tedd, Hertfordshire (GB); James Waddilove, Hertfordshire (GB); Jonty Angel, Hertfordshire (GB)

(73) Assignee: OCADO INNOVATION LIMITED, Hatfield, Herfordshire (GB)

( * ) Notice: Subject to any disclaimer, the term of this patent is extended or adjusted under 35 U.S.C. 154(b) by 0 days.

(21) Appl. No.: 15/555,749

(22) PCT Filed: Apr. 15, 2016

(86) PCT No.: PCT/EP2016/058407
§ 371 (c)(1),
(2) Date: Sep. 5, 2017

(87) PCT Pub. No.: WO2016/166324
PCT Pub. Date: Oct. 20, 2016

(65) Prior Publication Data
US 2018/0051459 A1    Feb. 22, 2018

(30) Foreign Application Priority Data

Apr. 15, 2015  (GB) .................................. 1506365.4
Aug. 13, 2015  (GB) .................................. 1514428.0
(Continued)

(51) Int. Cl.
*B65G 1/04*    (2006.01)
*A01G 9/16*    (2006.01)
(Continued)

(52) U.S. Cl.
CPC ........... *B65G 1/0464* (2013.01); *A01G 9/022* (2013.01); *A01G 9/16* (2013.01); *A01G 31/06* (2013.01);
(Continued)

(58) Field of Classification Search
CPC .. B65G 63/004; B65G 1/0464; B65G 1/0407; B65G 67/02; B62D 33/02; E04B 1/3483; E04B 1/34807
See application file for complete search history.

(56) References Cited

U.S. PATENT DOCUMENTS 2,037,895 A * 4/1936 Gugler ................ E04B 1/34869
137/357
2,701,065 A    2/1955 Bertel
(Continued)

FOREIGN PATENT DOCUMENTS

DE    2719953 A    7/1978
DE    2719953 A1 * 7/1978 ......... E04B 1/34807
(Continued)

OTHER PUBLICATIONS

The first application names Lars Sverker Ture Lindbo; Andrew John Ingram-Tedd; Pawel Karolinczak; and Matthew Whelan as inventors, is entitled "Robotic Container Handling Device and Methods".
(Continued)

*Primary Examiner* — Adriana Figueroa
(74) *Attorney, Agent, or Firm* — Buchanan Ingersoll & Rooney PC (57) ABSTRACT

A modular building system or storage system is disclosed with a number of stacks of containers as shown in FIG. 2, the stacks being positioned within a frame structure having uprights and a horizontal grid disposed above the stacks, the grid having substantially perpendicular rails on which load handling devices can run. Containers having functions asso-
(Continued)

ciated with a number of residential or commercial uses are moved in to and out of the stacks by the robotic handling devices running on the grid. The containers disposed in the stacks are selected by function on demand by a user. In this way the building is reconfigurable to take in to account required uses.

12 Claims, 9 Drawing Sheets

(30) Foreign Application Priority Data

| Oct. 13, 2015 | (GB) | 1518089.6 |
|---|---|---|
| Oct. 13, 2015 | (GB) | 1518091.2 |
| Oct. 13, 2015 | (GB) | 1518094.6 |
| Oct. 13, 2015 | (GB) | 1518111.8 |
| Oct. 13, 2015 | (GB) | 1518115.9 |
| Oct. 13, 2015 | (GB) | 1518117.5 |
| Feb. 9, 2016 | (GB) | 1602332.7 |
| Feb. 25, 2016 | (GB) | 1603328.4 |

(51) Int. Cl.

| A01G 31/06 | (2006.01) |
|---|---|
| B62D 33/02 | (2006.01) |
| B65G 63/00 | (2006.01) |
| B65G 67/02 | (2006.01) |
| B65G 1/06 | (2006.01) |
| B65G 57/03 | (2006.01) |
| E04B 1/348 | (2006.01) |
| E06B 9/68 | (2006.01) |
| A01G 9/02 | (2018.01) |
| A47L 7/00 | (2006.01) |
| B65G 1/137 | (2006.01) |
| B65D 21/02 | (2006.01) |
| A01G 9/18 | (2006.01) |

(52) U.S. Cl.
CPC ............ *A47L 7/0047* (2013.01); *B62D 33/02* (2013.01); *B62D 33/0207* (2013.01); *B65D 21/0212* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *E04B 1/34807* (2013.01); *E06B 9/68* (2013.01); *A01G 9/18* (2013.01); *B65G 1/0407* (2013.01); *B65G 2207/22* (2013.01); *B65G 2207/40* (2013.01); *E06B 2009/6818* (2013.01); *Y02A 40/254* (2018.01); *Y02P 60/148* (2015.11); *Y02P 60/216* (2015.11); *Y10S 901/01* (2013.01)

(56) References Cited

U.S. PATENT DOCUMENTS

| 3,721,056 | A | * | 3/1973 | Toan | E04B 1/20 |
| | | | | | 52/236.6 |
| 3,744,193 | A | * | 7/1973 | Lau | E04B 1/34807 |
| | | | | | 414/277 |
| 3,758,998 | A | * | 9/1973 | Ollis | E04B 1/34807 |
| | | | | | 52/745.03 |
| 3,823,520 | A | * | 7/1974 | Ohta | E04B 1/24 |
| | | | | | 52/73 |
| 4,059,931 | A | * | 11/1977 | Mongan | E04B 1/22 |
| | | | | | 52/223.5 |
| 4,088,232 | A | | 5/1978 | Lilly | |
| 4,561,554 | A | | 12/1985 | Swincicki | |
| 4,594,817 | A | * | 6/1986 | McLaren | A47C 19/20 |
| | | | | | 5/2.1 |
| 4,599,829 | A | * | 7/1986 | DiMartino, Sr. | E04B 1/3483 |
| | | | | | 410/79 |
| 4,723,381 | A | * | 2/1988 | Straumsnes | E04B 1/34807 |
| | | | | | 52/745.02 |
| 4,766,708 | A | * | 8/1988 | Sing | E04N 1/98 |
| | | | | | 248/585 |
| 4,779,552 | A | * | 10/1988 | Harsia | B63B 3/08 |
| | | | | | 114/65 R |
| 4,917,429 | A | | 4/1990 | Giger | |
| 4,973,219 | A | | 11/1990 | Brickner et al. | |
| 5,528,866 | A | * | 6/1996 | Yulkowski | E04H 1/04 |
| | | | | | 52/79.12 |
| 6,152,287 | A | | 11/2000 | Luria | |
| 6,470,630 | B1 | * | 10/2002 | Miyamoto | E04B 1/34807 |
| | | | | | 52/64 |
| 6,654,662 | B1 | | 11/2003 | Hognaland | |
| 8,408,863 | B1 | | 4/2013 | Benedict et al. | |
| 8,628,289 | B1 | | 1/2014 | Benedict et al. | |
| 9,663,937 | B2 | * | 5/2017 | Goldman | E04B 1/3483 |
| 9,796,080 | B2 | * | 10/2017 | Lindbo | B25J 9/0096 |
| 2002/0057956 | A1 | | 5/2002 | Jephcott | |
| 2003/0005626 | A1 | | 1/2003 | Yoneda et al. | |
| 2003/0141973 | A1 | | 7/2003 | Yeh et al. | |
| 2003/0156501 | A1 | | 8/2003 | Spindel et al. | |
| 2004/0016624 | A1 | | 1/2004 | Jephcott | |
| 2005/0220573 | A1 | | 10/2005 | Benedict et al. | |
| 2006/0201377 | A1 | | 9/2006 | Gielow | |
| 2007/0016328 | A1 | | 1/2007 | Ziegler et al. | |
| 2007/0144079 | A1 | * | 6/2007 | Hourihan | E04B 1/34807 |
| | | | | | 52/79.1 |
| 2008/0075566 | A1 | | 3/2008 | Benedict et al. | |
| 2008/0075568 | A1 | * | 3/2008 | Benedict | B63C 15/00 |
| | | | | | 414/267 |
| 2008/0075569 | A1 | * | 3/2008 | Benedict | B65G 1/0464 |
| | | | | | 414/269 |
| 2008/0134458 | A1 | | 6/2008 | Ziegler et al. | |
| 2008/0140255 | A1 | | 6/2008 | Ziegler et al. | |
| 2008/0155768 | A1 | | 7/2008 | Ziegler et al. | |
| 2008/0213073 | A1 | | 9/2008 | Benedict et al. | |
| 2010/0275512 | A1 | | 11/2010 | Nien | |
| 2011/0027059 | A1 | | 2/2011 | Benedict et al. | |
| 2011/0192082 | A1 | | 8/2011 | Uchiyama | |
| 2011/0271469 | A1 | | 11/2011 | Ziegler et al. | |
| 2012/0036659 | A1 | | 2/2012 | Ziegler et al. | |
| 2012/0147558 | A1 | | 6/2012 | Dunn, Jr. et al. | |
| 2012/0272500 | A1 | | 11/2012 | Camenisch et al. | |
| 2013/0011226 | A1 | | 1/2013 | Camenisch et al. | |
| 2014/0026474 | A1 | | 1/2014 | Kulas | |
| 2014/0069007 | A1 | | 3/2014 | Chen et al. | |
| 2014/0191633 | A1 | | 7/2014 | Zhu et al. | |
| 2014/0283452 | A1 | | 9/2014 | Dittman | |
| 2014/0289992 | A1 | | 10/2014 | Ziegler et al. | |
| 2015/0045944 | A1 | | 2/2015 | Visser et al. | |
| 2015/0127143 | A1 | | 5/2015 | Lindbo et al. | |
| 2016/0095309 | A1 | | 4/2016 | Camenisch et al. | |
| 2016/0129587 | A1 | | 5/2016 | Lindbo et al. | |
| 2016/0140488 | A1 | | 5/2016 | Lindbo | |

FOREIGN PATENT DOCUMENTS

| DE | 4439740 C1 | 5/1996 |
|---|---|---|
| DE | 10 2011 103443 A1 | 12/2012 |
| DE | 10 2012 025184 A1 | 6/2014 |
| EP | 0 767 113 B1 | 7/2002 |
| EP | 1037828 B1 | 9/2003 |
| EP | 2 133 289 A1 | 12/2009 |
| EP | 2 308 283 A1 | 4/2011 |
| EP | 2 783 913 A2 | 10/2014 |
| EP | 2 829 210 A2 | 1/2015 |
| GB | 1157145 A | 7/1969 |
| GB | 2514930 A | 12/2014 |
| GB | 2518259 A | 3/2015 |
| GB | 2520104 A | 5/2015 |
| GB | 2527543 A | 12/2015 |
| GB | 2528573 A | 1/2016 |
| GB | 2529029 A | 2/2016 |

(56) References Cited

FOREIGN PATENT DOCUMENTS

| | | |
|---|---|---|
| GB | 2529527 A | 2/2016 |
| JP | 09-299496 A | 11/1997 |
| JP | 2000-255786 A | 9/2000 |
| LU | 88 754 A1 | 10/1998 |
| NO | 317366 B1 | 10/2004 |
| WO | WO 92/04713 A1 | 3/1992 |
| WO | WO 97/38928 A1 | 10/1997 |
| WO | WO 98/49075 A1 | 11/1998 |
| WO | WO 03/031285 A1 | 4/2003 |
| WO | WO 03/095339 A1 | 11/2003 |
| WO | WO 2004/096509 A1 | 11/2004 |
| WO | WO 2008/108845 A2 | 9/2008 |
| WO | WO 2011/047710 A1 | 4/2011 |
| WO | WO 2013/082601 A1 | 6/2013 |
| WO | WO 2013/147597 A1 | 10/2013 |
| WO | WO 2013/162192 A1 | 10/2013 |
| WO | WO 2013/167907 A1 | 11/2013 |
| WO | WO 2013/169110 A1 | 11/2013 |
| WO | WO 2014/195901 A1 | 12/2014 |
| WO | WO 2014/203126 A1 | 12/2014 |
| WO | WO 2015/105426 A1 | 7/2015 |

OTHER PUBLICATIONS

The second application names Lars Sverker Ture Lindbo; Paul Clarke; Andrew John Ingram-Tedd; and Pawel Karolinczak as inventors, is entitled "Storage System and Methods".
The third application names Paul Clarke; Lars Sverker Ture Lindbo; Andrew John Ingram-Tedd; and Pawel Karolinczak as inventors, is entitled "Storage System and Methods".
The fourth application names Paul Clarke; Lars Sverker Ture Lindbo; and Andrew John Ingram-Tedd as inventors, is entitled "Storage System With Partition Means and Methods".
The fifth application names Lars Sverker Ture Lindbo; and Andrew John Ingram-Tedd as inventors, is entitled "Robotic Picking System Device and Methods".
The sixth application names Lars Sverker Ture Lindbo; and Andrew John Ingram-Tedd as inventors, is entitled "Object Handling System and Methods".
The seventh application names Lars Sverker Ture Lindbo; and Andrew John Ingram-Tedd; Pawel Karolinczak; and Alexander Howard Whitaker as inventors, is entitled "Growing System and Methods".
International Search Report (PCT/ISA/210) dated Jul. 15, 2016, by the European Patent Office as the International Searching Authority for International Application No. PCT/EP2016/058467.
Written Opinion (PCT/ISA/237) dated Jul. 15, 2016, by the Japanese Patent Office as the International Searching Authority for International Application No. PCT/EP2016/058467.
International Search Report (PCT/ISA/210) dated Jul. 20, 2016, by the European Patent Office as the International Searching Authority for International Application No. PCT/EP2016/058466.
Written Opinion (PCT/ISA/237) dated Jul. 20, 2016, by the Japanese Patent Office as the International Searching Authority for International Application No. PCT/EP2016/058466.
International Search Report (PCT/ISA/210) dated Jul. 18, 2016, by the European Patent Office as the International Searching Authority for International Application No. PCT/EP2016/058405.
Written Opinion (PCT/ISA/237) dated Jul. 18, 2016, by the Japanese Patent Office as the International Searching Authority for International Application No. PCT/EP2016/058405.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the Japanese Patent Office as the International Searching Authority for International Application No. PCT/EP2016/058384.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the Japanese Patent Office as the International Searching Authority for International Application No. PCT/EP2016/058381.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the Japanese Patent Office as the International Searching Authority for International Application No. PCT/EP2016/058366.
International Search Report (PCT/ISA/210) dated Jul. 14, 2016, by the European Patent Office as the International Searching Authority for International Application No. PCT/EP2016/058407.
Written Opinion (PCT/ISA/237) dated Jul. 14, 2016, by the Japanese Patent Office as the International Searching Authority for International Application No. PCT/EP2016/058407.
Search Report dated Dec. 22, 2016, by the European Patent Office for Application No. 1606679.7.
Search Report dated Dec. 21, 2016, by the European Patent Office for Application No. 1606677.1.
Search Report dated Mar. 8, 2016, by the European Patent Office for Application No. 1518089.6.

* cited by examiner

SYSTEM AND METHOD FOR CONFIGURATION OF BUILDINGS OR STORAGE

The present invention relates to a system and method for configuration of buildings and rooms within buildings or storage. More specifically but not exclusively, it relates to a mechanised system for storing goods associated with buildings or changing the arrangement of rooms within a building or moving portions of a building to a different location.

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

Modular buildings are known. For example, to aid fast assembly and construction of buildings, rooms may be laid out in an identical fashion and manufactured with all services and fixtures integrally formed and assembled together in a location where the building is required. For example, hotels may be manufactured in modules and assembled on site, the final hate comprising a series of identical rooms mounted in a building structure.

Other forms of modular buildings are know where a structure comprising a number of building modules is located a given location and on request from a user, a particular module can be removed and transported to a different location. See for example kasita.com where a building support structure carries a small number of building modules that may be removed and transported to alternative locations.

In all such buildings, additional storage will be required.

According the invention there is provided reconfigurable modular building system comprising a plurality of property containers, the containers being disposed in stacks within a frame work structure, the frame work structure comprising a series of substantially vertical uprights having a substantially horizontal grid mounted thereon, the grid comprising two substantially perpendicular sets of rails on which at least one of load handling device is operable, the load handling device comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the of wheels engaged with the rails which the containers comprise an interior structure arranged to have a given function, the interior function being selected from a plurality of available functions, such that a stack may be configured to comprise containers of a number of different functions, the stack being reconfigurable on demand to include containers of alternative functions the containers being arranged such that each container supports the container immediately above in the stack.

According to the invention there is further provided a robotic storage system comprising a plurality of containers, the containers being disposed in stacks within a frame work structure, the frame work structure comprising a series of substantially vertical uprights having a substantially horizontal grid mounted thereon, the grid comprising two substantially perpendicular sets of rails on which at least one load handling device is operable, the or each load handling device comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails in which the containers comprise self-storage units accessible by at least one user, the storage system further comprising means for accessing at least one predetermined container, the user being provided with said means for accessing the or each container required, the containers being arranged such that each container supports the container immediately above in the stack.

According to the invention there is further provided a method of reconfiguring a building comprising the steps of: providing a series of containers each having an interior defined by a predetermined function; stacking a plurality of containers within a framework, providing a robotic load handling device on a grid above the stacks of containers; moving or removing the containers as required, the reconfiguration of the building occurring as a result of moving containers having different functions to different locations within the building.

The key benefits over the prior art of known modular buildings is the ease of which rooms or whole properties may be rearranged or transported to alternative locations, even worldwide.

Preferably, standardised container sizes are used to enable the rooms or entire properties, depending on the configuration used, be easily transported on existing vehicles or platforms such as container ships.

With regard to the storage of items associated with the reconfigurable building, it will be appreciated that the density of storage is greatly increased by removal of corridors or access points within a building to access storage rooms.

The invention will now be described with reference to the accompanying diagrammatic drawings in which.

Figure 1:
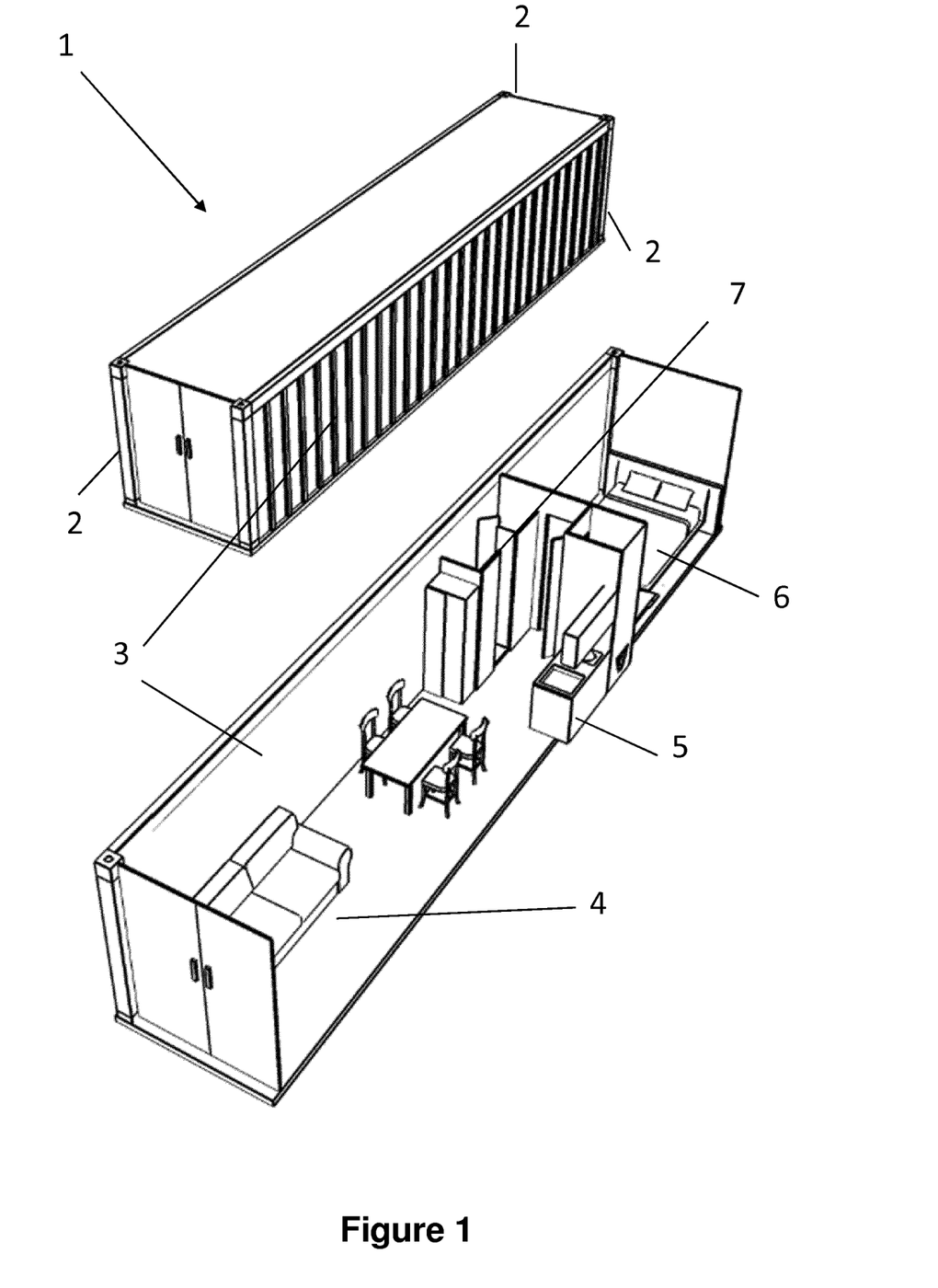
FIG. 1 shows a schematic perspective view of one form of the invention in which a container comprises an interior arranged in the format of a property including a living area, a dining area, a kitchen area and a bedroom area.

FIG. 1 shows a container 1 having an interior arranged as living accommodation. The container 1 comprises a structure having four supporting uprights 2 linked by external walls 3. The external walls 3 may comprise solid members as shown in FIG. 1a or may comprise members having windows and or doors formed therein.

The interior of the container 1 may comprise internal walls to divide the space therein to separate areas to form a living area 4, a kitchen area 5, a sleeping area 6 and a bathroom area 7, thereby forming a container property 40. Alternatively the whole container may be arranged in an open plan manner. The container property 40 may be provided with linkages to enable the property 40 to be connected to the appropriate services when the container 1 is docked in to an appropriate container property 40 structure to form a modular container property 40 building, as described in more detail below.

Figure 2A:
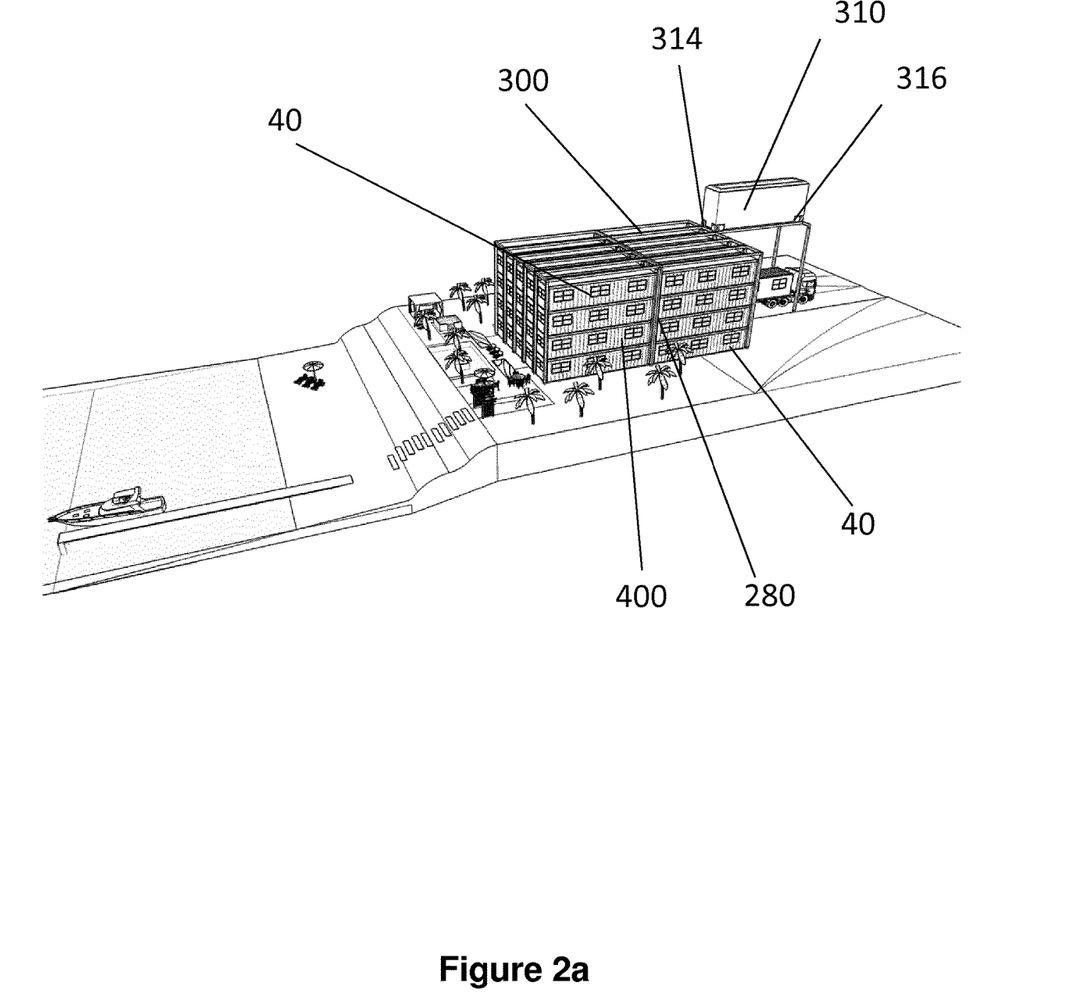
FIGS. 2*a*, 2*b* and 2*c* show schematic perspective views of a building comprising a number of container properties as shown in FIG. 1 arranged in a building structure, FIGS. 2*a* and 2*c* showing a robotic load handling device and a vehicle delivering a container property to be added to the building structure.
Figure 2B:
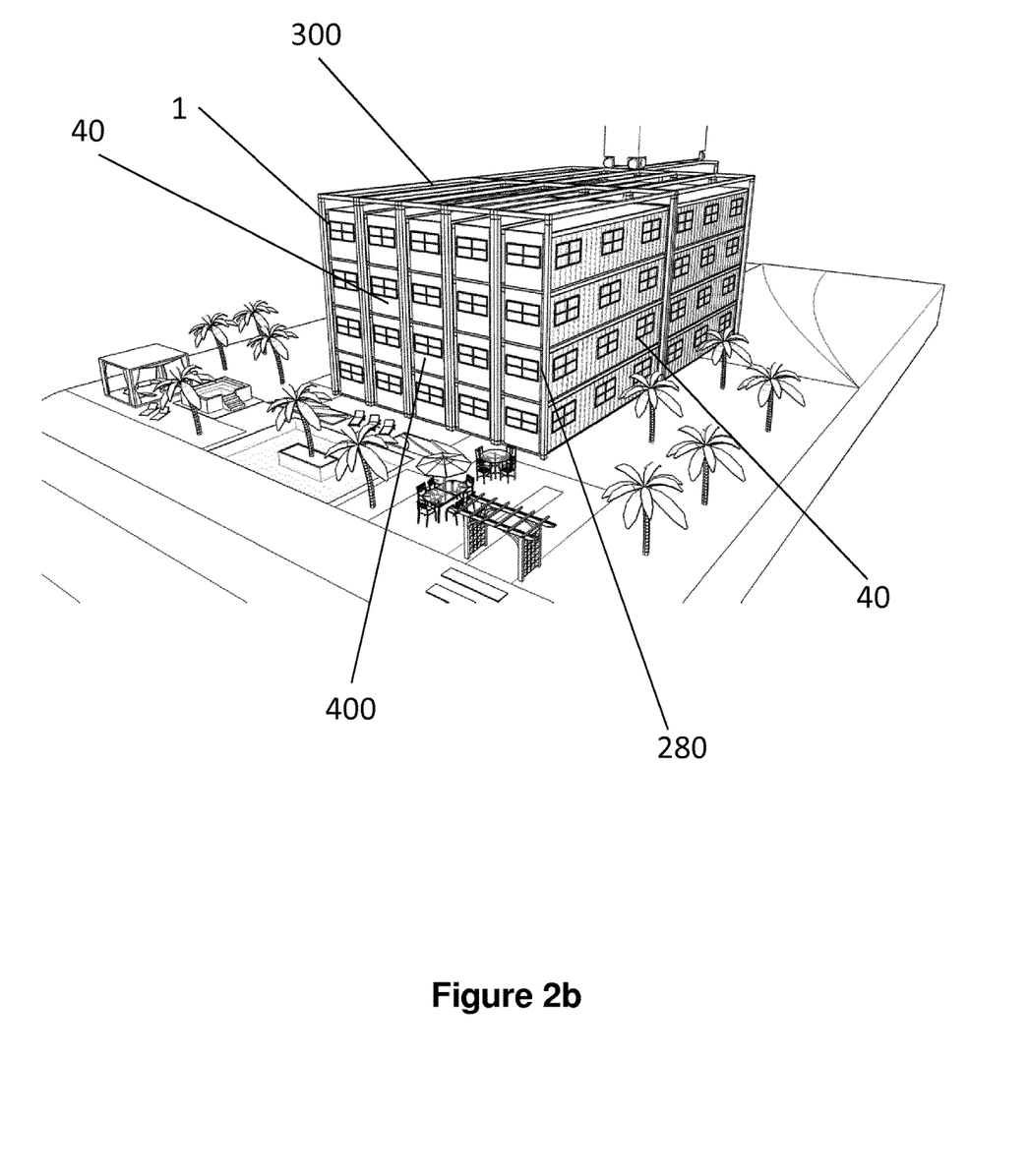
Figure 2C:
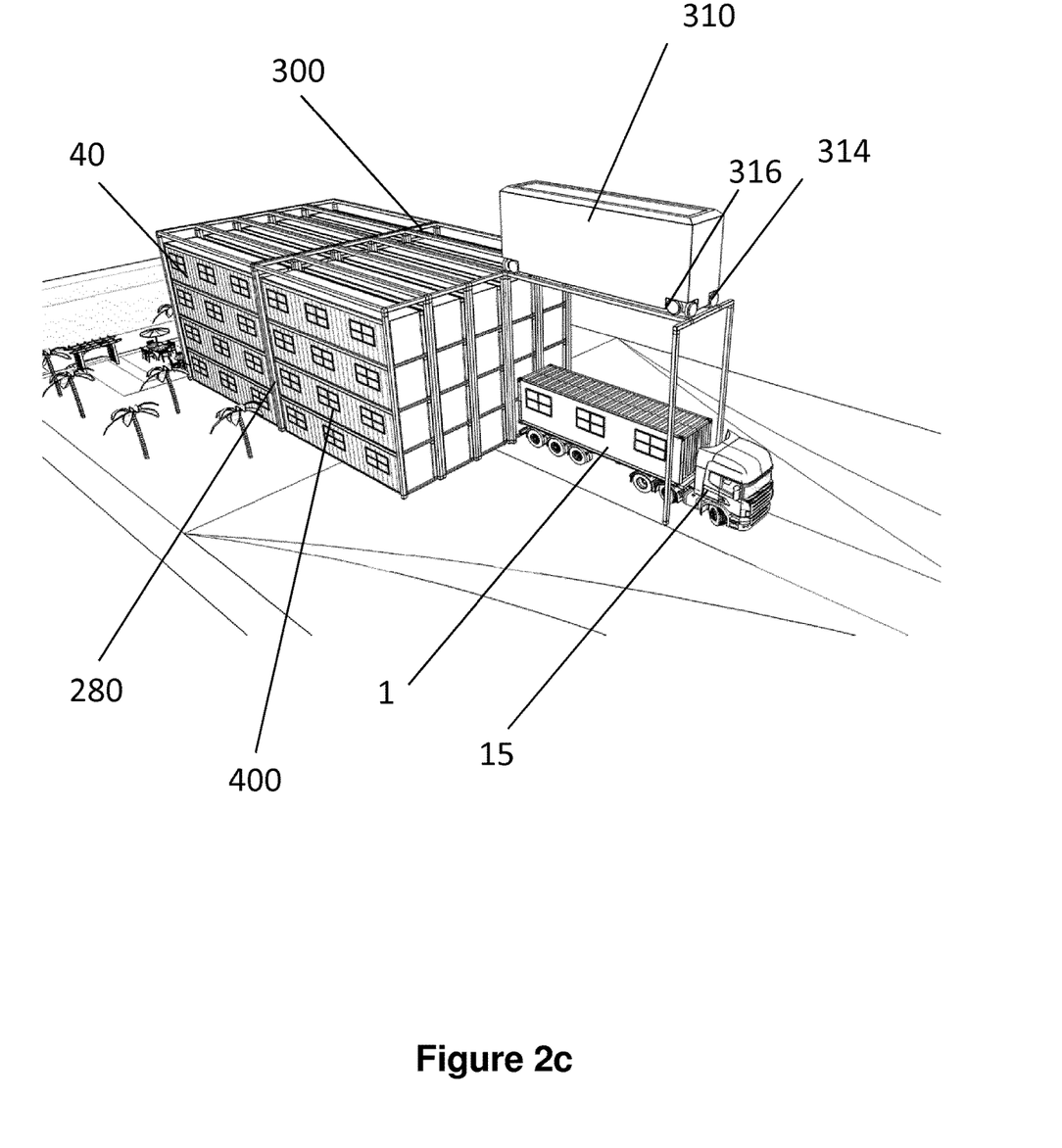

A modular container building is constructed that comprises a number of container properties 40 stacked one on top of another. Such a container building is shown in FIG. 2. As shown in FIG. 2, the stacks 400 of container properties 40 are located within a framework structure. The structure comprises a plurality of upright members 280 that support horizontal members 300a, 300b. A first set of parallel horizontal members 300a is arranged substantially perpendicularly to a second set 300b of parallel horizontal members to form a horizontal grid structures 300 supported by the upright members 280. The members 280, 300a, 300b, 300 are typically manufactured from metal and comprise girders, RSJs or metal joists or the like. The container properties 40 are stacked between the members 280 of the frame structure.

The top level of the frame structure includes rails 300a, 300b arranged in a grid pattern across the top of the stacks 400. The grid structure 300 supports a plurality of robotic load handling devices 310. A first set of substantially parallel rails guide movement of the load handling devices 310 in a first direction (X) across the top of the frame structure, and a second set of substantially parallel rails, arranged substantially perpendicular to the first set, guide movement of the robotic load handling devices 310 in a second direction (Y), substantially perpendicular to the first direction. In this way, the rails allow movement of the load handling devices 310 in two dimensions in the X-Y plane, such that a load handling device 310 can be moved into position above any of the stacks 400.

Each load handling device 310 comprises a vehicle which is arranged to travel in the X and Y directions on the rails of the frame structure, above the stacks 400. A first set of wheels 314, consisting of a pair of wheels 314 on the front of the vehicle and a pair of wheels 314 on the back of the vehicle, are arranged to engage with two adjacent rails of the first set of rails. Similarly, a second set of wheels 316, consisting of a pair of wheels 316 on each side of the vehicle 310, are arranged to engage with two adjacent rails of the second set of rails. Each set of wheels 314, 316 can be lifted and lowered, so that either the first set of wheels 314 or the second set of wheels 316 is engaged with the respective set of rails at any one time.

When the first set of wheels 314 is engaged with the first set of rails and the second set of wheels 316 are lifted clear from the rails, the wheels 314 can be driven, by way of a drive mechanism (not shown) housed in the vehicle, to move the load handling device 310 in the X direction. To move the load handling device 310 in the Y direction, the first set of wheels 314 are lifted clear of the rails, and the second set of wheels 316 are lowered into engagement with the second set of rails. The drive mechanism can then be used to drive the second set of wheels 316 to achieve movement in the Y direction.

In this way, one or more robotic load handling devices 310 can move around the grid above the top surface of the stacks 400 on the frame structure under the control of a central control system (not shown). Each robotic load handling device 310 is provided with means for lifting out one or more container properties 40 from the stack 400. In the instance where multiple robotic load handling device 310 are used, it will be appreciated that multiple containers 40 may be placed in to the storage system or removed from the storage system at any one time.

The robotic load handling devices 310 act in a co-operative fashion to remove the desired container properties 40. For example, if a container properly 40 in the second level down is required, a first load handling device 310 removes the container property 40 immediately above the target container property 40 and places it in an alternative vacant location. A further load handling device 310 can then access the target container property 40 and remove it to the vehicle loading area for transport to an alternative location or to the required location within the existing budding.

In the first embodiment described above, each container property is an individual 'home' that may be removed from a given container property 40 building structure and transported to an alternative container property building structure located in another town, city or even country. The container property 40 may be treated as any other shipping container and transported in such a fashion.

It will be appreciated that prior to removal from the container property building, all services will need to be disconnected and all interior fixtures and fitting secured as required to prevent damage.

In a second embodiment of the invention described above, it will be appreciated that as the container properties 40 are located in a container property building comprising load handling devices 310 operable on a grid above the stacks of container properties, the container properties 40 may be moved around within the building to provide a reconfigurable building.

In the second embodiment of the invention, each of the container properties 40 has a different use. For example, a first container comprises a kitchen diner area, a second container comprises a sleeping area and a third container comprises a gymnasium and recreation area. In this war a larger property can be envisaged comprising a plurality of container rooms reconfigurable as required. For example, a user may only normally require a container property 40 as described in the first embodiment but may need extra sleeping areas when visitors are expected. Using this modular reconfigurable approach, an additional container room comprising additional sleeping areas may be ordered and delivered above, or adjacent the existing container property to provide additional sleeping areas.

Furthermore a gym or recreation container room may be ordered for shorter periods of time, for example for a gathering over a weekend, to enable additional entertaining space. Each of these additional rooms could be rented on a predetermined length of time basis and may be booked in advance to enable correct repositioning. However, at short notice, rooms may be reconfigured to be placed in adjacent positions as required by the load handling devices 310 operable on the grid.

It will be appreciated that in this way a building may be created with bespoke and adaptable topology, layout and functionality. The reconfigurable nature of the container rooms allows for storage, garages, numbers of living rooms, bathrooms and entertaining spaces to be changed at will. Furthermore, corridors and hallway containers may be envisaged to link the container rooms and properties in the building at any one time. The framework structure also enables lifts and lift shafts to be catered for as required, between container properties 40.

It will also be appreciated that rooms with special functionality that may not be used often or may only be needed for a predetermined time, for example gyms, saunas, nursery rooms or invalid accommodation may be stored off site and input in the building when required or ordered by a user.

It will be appreciated that the modular reconfigurable approach above introduces the concept of pay-per-use accommodation, so only the accommodation or rooms required are paid for as they are needed.

It will further be appreciated that special doors and or windows with interlock mechanisms may be required to ensure that no opening may be activated or used unless the correct configuration of container properties is in place.

In this way, it will be appreciated that there above method of reconfiguring buildings enables continuous upgrading of buildings to be undertaken such that the building does not become obsolete.

It will further be appreciated that the above system enables views and positions of rooms within buildings to be changed. This provides the opportunity to auction specific locations having desirable views or proximity to other communal container modules.

Moreover, it will be appreciated that the system described above may be used in the manner of a timeshare property. A given customer may own the container property 40 but want it located in different countries or different locations within a given country at different times of the year. For example, a beach front property in the warmer months and a skiing property in the winter. The reconfigurable and moveable nature of the property described above enables this.

Furthermore, the system described above is not limited to residential properties but may be used to create reconfigurable commercial properties. These may include, but not be limited to shopping malls, hospitals, hotels, prisons and any other building arrangement where the configuration of the rooms may require changing in response to external influences.

In the case of a reconfigurable shopping centre or mall, it would be possible to auction the locations with the best footfall or reconfigure the mall to have different shops for different seasons, restaurants and temporary pop up shops. Alternatively, there could be a single location where goods are purchased, the remaining containers being used as fitting rooms, storage for goods, try before you buy rooms, or display rooms.

In another example, a hospital may be envisaged having reconfigurable rooms, such as wards, operating theatres, clinic rooms and clean rooms. In an additional embodiment, rooms such as operating theatres could be used once then removed and replaced by an already cleaned and sanitised theatre, the previously used one being removed for cleaning and sanitising and placed in to storage awaiting the next use. Wards could be added and removed as required depending on the numbers of patients forecast for admission.

In a further example, university accommodation may be reconfigured for different uses in term time and in vacation time, enabling additional living, working or laboratory space to be generated as required. In vacation time, lecture theatre space could be converted to living accommodation for visitors or to hotel rooms.

It will be appreciated that in all the examples described above, the framework structure and uprights 280 may be required to route or provide services to the container rooms or properties. Such services may comprise for example, electricity, water, power, compressed air, cable or television services or any other service required by the property. UK Patent Application No GB1518115.9, hereby incorporated by reference, details a system and method by which services and utilities may be transmitted and supplied round a framework of the nature described above.

As described above, the framework in which the modular building components are located comprises a series of metallic uprights 280 having a substantially horizontal grid structure 300 mounted thereon. The container properties 40 comprising the buildings, rooms or otherwise are located within the framework. It will be appreciated that services such as power, may be routed via appropriate cabling throughout the framework structure. The cabling may be routed within the extrusion comprising the framework but may also be retrofitted to existing framework structures. The services routed via the framework and grid need not be limited to power but could include telecommunications or light via fibre optics.

In a similar manner it is possible to route water via paperwork mounted on or within the framework structure 16. It will be appreciated that water may be required for plumbing, sprinkler systems, heating and other potential uses, particularly in hospital or leisure environments.

In one example, power may be transmitted along suitable cables routed on the framework structure. Depending on the use of the storage system, the building module may require power. Individual building modules comprising container properties 40 may comprise heating means, cooling means, freezing means or lighting means. These services would require power that may be transmitted round the framework. It will be appreciated that due to the nature of operation of the system it is preferable that the containers are not in fixed contact with the framework an accordingly, all connection between the modular buildings and the framework may be remotely releasable, or may comprise telescopic type umbilical connections of any other suitable form of connections.

However, it will be appreciated that non-contacting methods of transmitting the required power to individual containers 10 may be used, for example magnetic induction or RF induction. In this way, power is supplied to the service means in individual modular buildings without the need for the container to be in contact with the upright. The uprights 280 are located adjacent the corners of the containers and each upright has guiderails for the corners of the modular building. It will be appreciated that there will be some tolerance between the guiderails and the stacks 400 comprising container properties 40 or rooms creating the modifier buildings.

The robotic load handler 310 comprises a gripper, the gripper being larger than the container property 40 or rooms and ensuring that the container property 40 or room is always guided squarely on top of the container 40 located below in a given stack. In this arrangement, it will be appreciated that it is possible to provide contact brushes between the container properties 40 in a stack 400 and the framework uprights 280. It will be appreciated that these contact brushes may be located along the edge of each container comprising the modular building.

These stackable container properties 40 may be provided with electrical connections between container properties 40 in a stack 400. Those may comprise electrically conductive pads on co-operating surfaces of adjacent container properties 40. In this way power transmitted to a stack 400 via a single non-contacting point between the upright 280 and a container 40 may be transmitted throughout the stack 400. Furthermore, the container properties 40 in a stack 400 may be provided with releasable latching mechanisms to physically and/or electrically connect adjacent container properties 40 in a stack 400 together. Such latching mechanisms may comprise magnetic or electromagnetic latching means or any other suitable form of releasable latching mechanism.

In a third aspect of the invention, the framework carries physical services such as fluids around the system. Pipes may be routed around the framework carrying water of gas. The pipework may be arranged to route fluids to individual container properties 40. Alternatively, fluids may be releasable in to the atmosphere in the vicinity of the stacks 400. For example, certain containers 10 may contain ignitable products such as matches. In the event that the matches ignite, sensors within the framework would detect the heat, fire or smoke, and a visual inspection via a camera may identify an individual container 10. Water may be directed in to that individual container 10. In this way, a fire may be contained within a single container 10 or a few containers.

In a conventional warehouse situation, sprinklers may be deployed from the roof of the warehouse. In a modular building system as described herein, such a sprinkler system may be routed to the interior of each container 40 and may cover a large area.

Other fire suppressant means utilise gases such as nitrogen to starve any fire of oxygen. As an alternative to water, fire suppressant gases may be routed round the container buildings 1. In the event of a gas deployment, again this could be directed at individual container properties 40 but may also be in the vicinity of a stack 400 or a number of stacks 400. It will be appreciated that a lack of oxygen in the atmosphere in a given area of the system may cause danger should maintenance be required by personnel. Use of gas sensors within the framework may be envisaged will establish if the environment is safe to inspect.

The uprights 280 and the underside of the grid 300 may be provided with connectors for connection of the container properties 40 or the stacks 400 of container properties 40 to the framework. For example, provision of power, data, signals and services on the framework requires connection to the containers via suitable connections, if the services are to be utilised by the container properties 40. Any suitable connection means may be used that can connect to a container 40 or to which container properties 40 can releasably connect. For example telescopic umbilical connectors may be used that can extend to connect the container properties 40 to the framework.

The uprights 280 and the framework may be provided with sensing means capable of identifying individual container properties 40, stacks 400 of container properties 40 or objects contained within the container properties 40. Sensing means may comprise barcodes on the container properties 40 and barcode readers on the uprights 280, alternatively camera means may be utilised. Any suitable method of labelling individual container properties 40 and reading said labels may be used to achieve the same objective.

In use, the identification and the location of given container properties 40 by sensing means on the framework 14 enables the system to establish the identity, and hence contents, of individual container properties 40 adjacent to sensors, connectors and service means. In this way individual container properties 40 may be controlled, monitored or treated by means provided on the framework or the grid. For example said sensor and controlling means may control the temperature in individual container properties 40; control the level of nutrients applied to the content of individual container properties 40 in the case of a garden container 40; communicate with the content of individual container properties 40; and transmit data via the content of individual container properties 40.

It will be appreciated that due to the presence of the load handling devices 130 on the grid 300 that the services provided within the framework via the uprights 280 may need to be routed from the base of the storage system.

It will be appreciated that in all aspects of the invention, the services provided on the framework are not limited to those specifically described and that and service that may be routed via the uprights 280 and the underside of the grid 300 may be installed.

It will be appreciated that all the above embodiments are described with reference to the rooms or properties being sized as shipping containers. However, it will be appreciated that any suitably sized container may be used that can fulfil the desired function and be moved and transported by appropriately sized load handling devices and vehicles for movement to alternative locations.

For example, a hotel with reconfigurable rooms may be envisaged where it is possible to check in one location and sleep whilst your container is moved to an alternative location. This would require the containers to be a smaller size.

Figure 3:
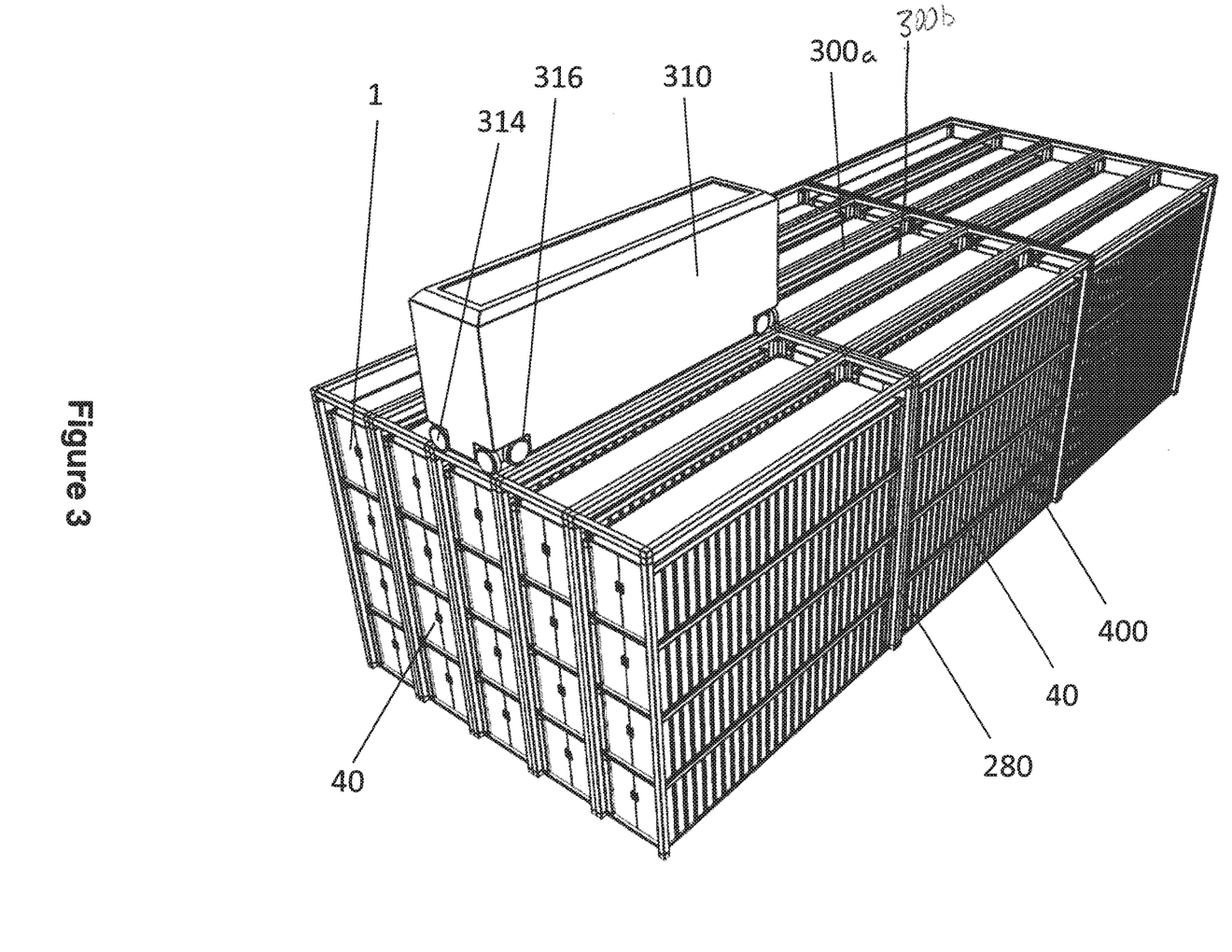
FIG. 3 shows a schematic perspective view of a storage area for container properties as shown in FIG. 1, the container properties being removeable and re-arrangeable by a robotic load handling device.

It will be appreciated in all the above examples that when rooms or properties are not required, they need to be stored in a location remote from the container building. FIG. 3 shows one form of container property storage system. It will be appreciated that the storage area operates in a similar manner to that described above for the buildings per se but that there is no requirement for interconnectivity or for the uprights or grid structure to provide services.

Rooms and properties of different applications and sizes may be stored in a single location, although different load handling devices and grid structures would be required for different sized properties. However, they may still be stored in a single location.

In a similar manner to that described above, when a given room type or property is required, a load handling device or a combination of a plurality of load handling devices accesses the required container and removes it to a output port of the storage system. From this point it is loaded on to an appropriately sized vehicle for onward transport to the reconfigurable building location.

FIG. 3 shows container property or container room storage system as described above, the system showing a single load handling device 310 active above the stacks 400 of containers 1. It will be appreciated that in larger storage facilities a plurality of load handling devices 310 may act on the tracks above the grid to enable multiple container properties to be moved at any given time.

It will be appreciated that any form of load handling 310 device may be in use and that any number of robotic load handling devices be used. The container property storage system as shown in FIG. 3 is representative only. Moreover, the nature and size of container properties 40 may require a larger facility that that shown in FIG. 3.

The grid structure of the storage area comprises a grid structure 300 on which robotic load handling devices 310 are operative. The container properties 40 are disposed beneath the grid 300 in stacks. The stacks 110 are arranged such that a single stack of containers is located beneath a grid spacing in the grid such that the robotic load handling devices 310 may raise and lower the container rooms and properties in to and out of the stacks through the grid spacing.

In this way, the container rooms or properties are stored in an efficiently packed manner in a location remote from the modular budding when not required. In this way a modular building in a densely inhabited area such as a city centre may be efficiently used by moving and reconfiguring the rooms and properties container therein, the unused rooms or properties being stored in a cheaper or less densely inhabited or less desirable location.

Figure 4:
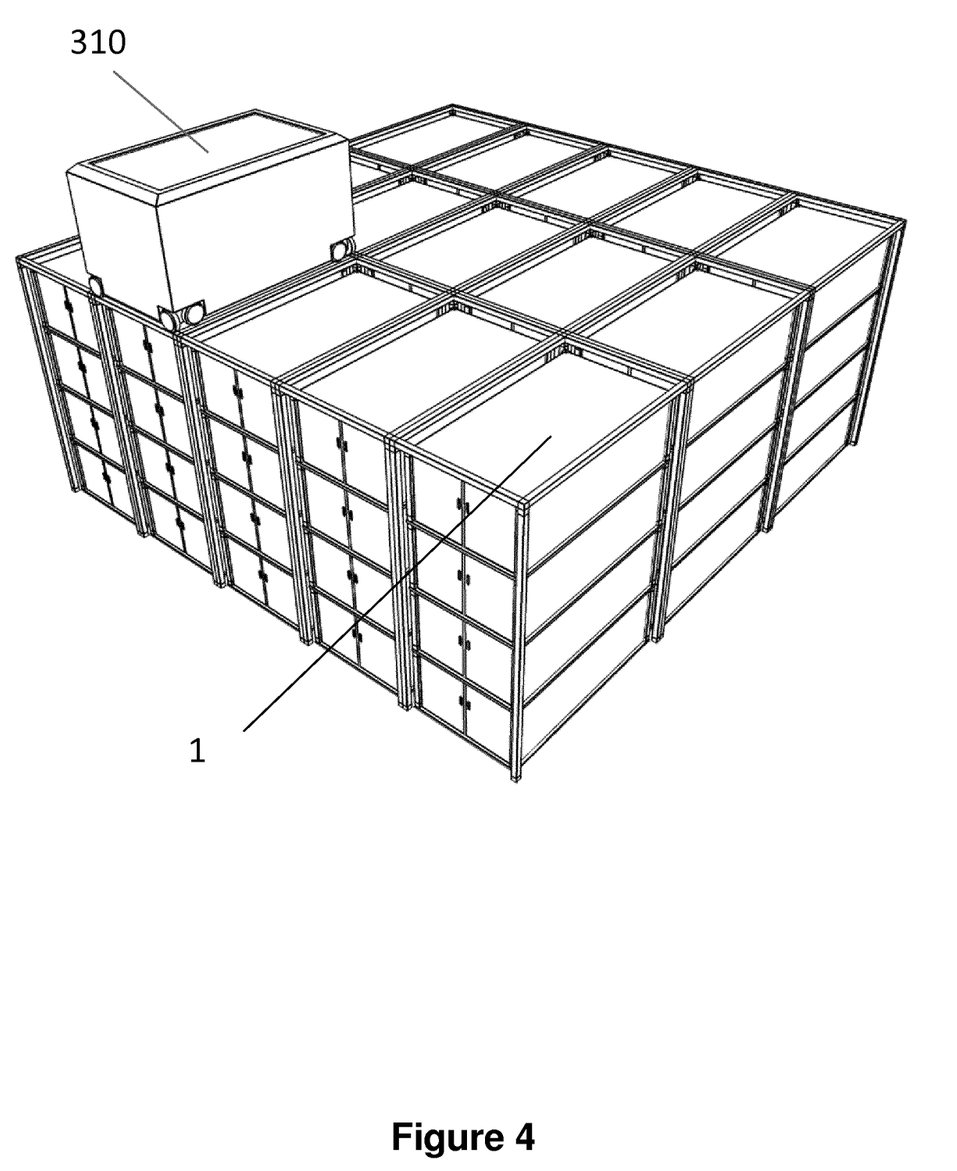
FIG. 4 shows a schematic perspective view of a robotic storage system in accordance with a further form of the invention, the storage system comprising containers for storing goods associated with the modular buildings of FIGS. 1 to 3.
Figure 5:
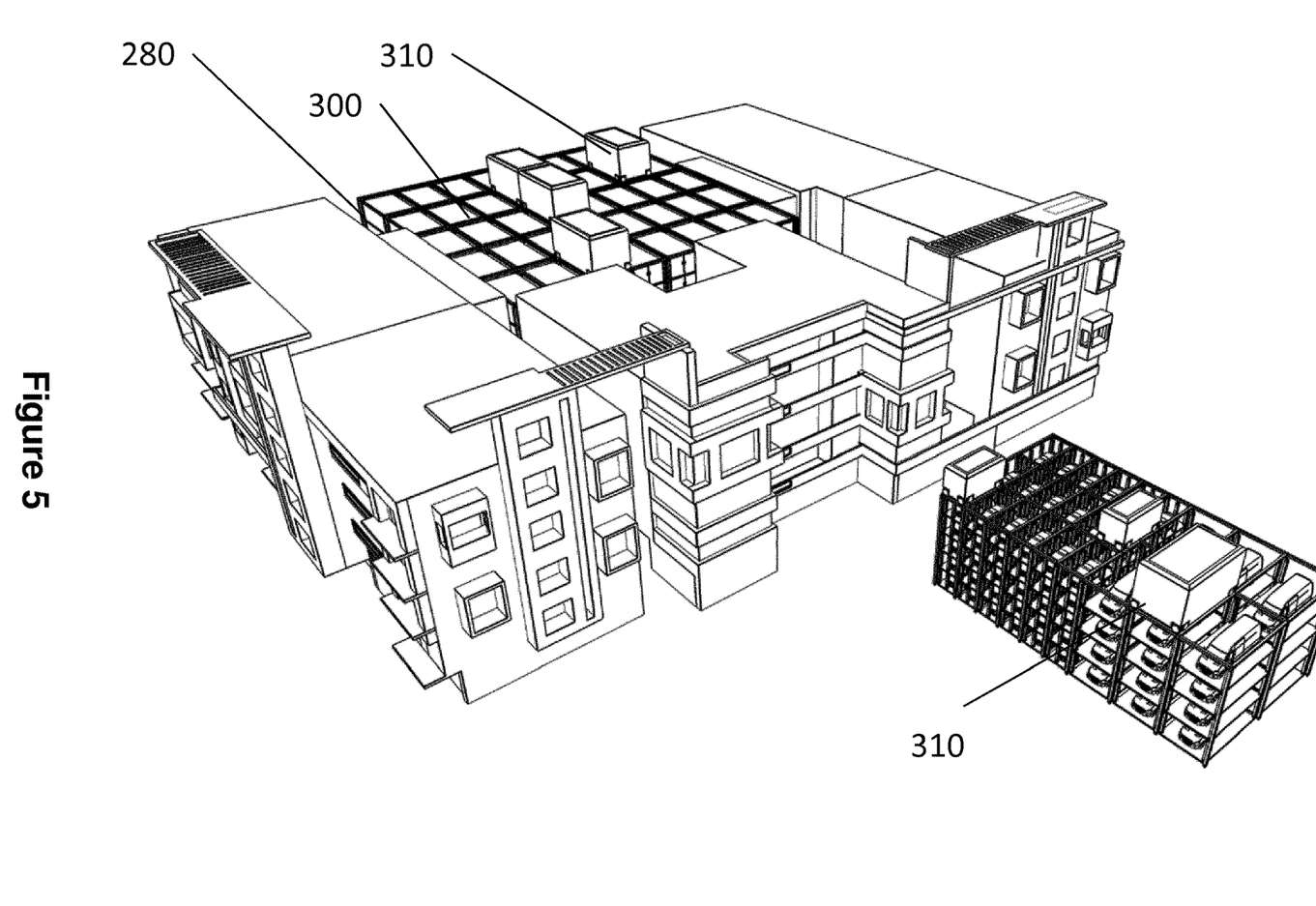
FIG. 5 shows a schematic perspective view of two forms of storage system of FIG. 4 associated with a residential property, a vehicle storage system in accordance with one form of the invention and a storage system for items requiring storage for users of the building in accordance with a further form of the invention.
Figure 6:
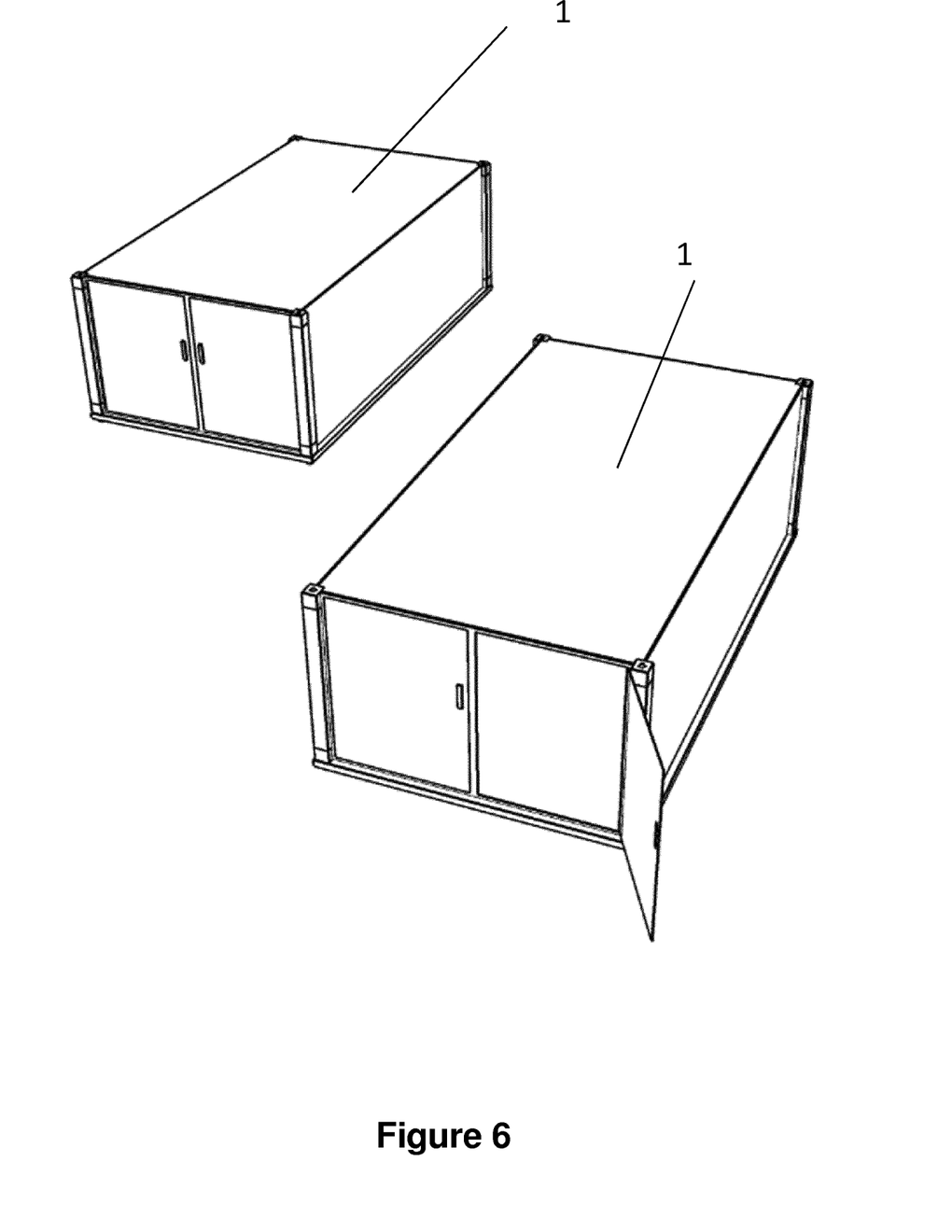
FIG. 6 shows a schematic perspective view of one form of storage container for use in a robotic self-storage system.
Figure 7:
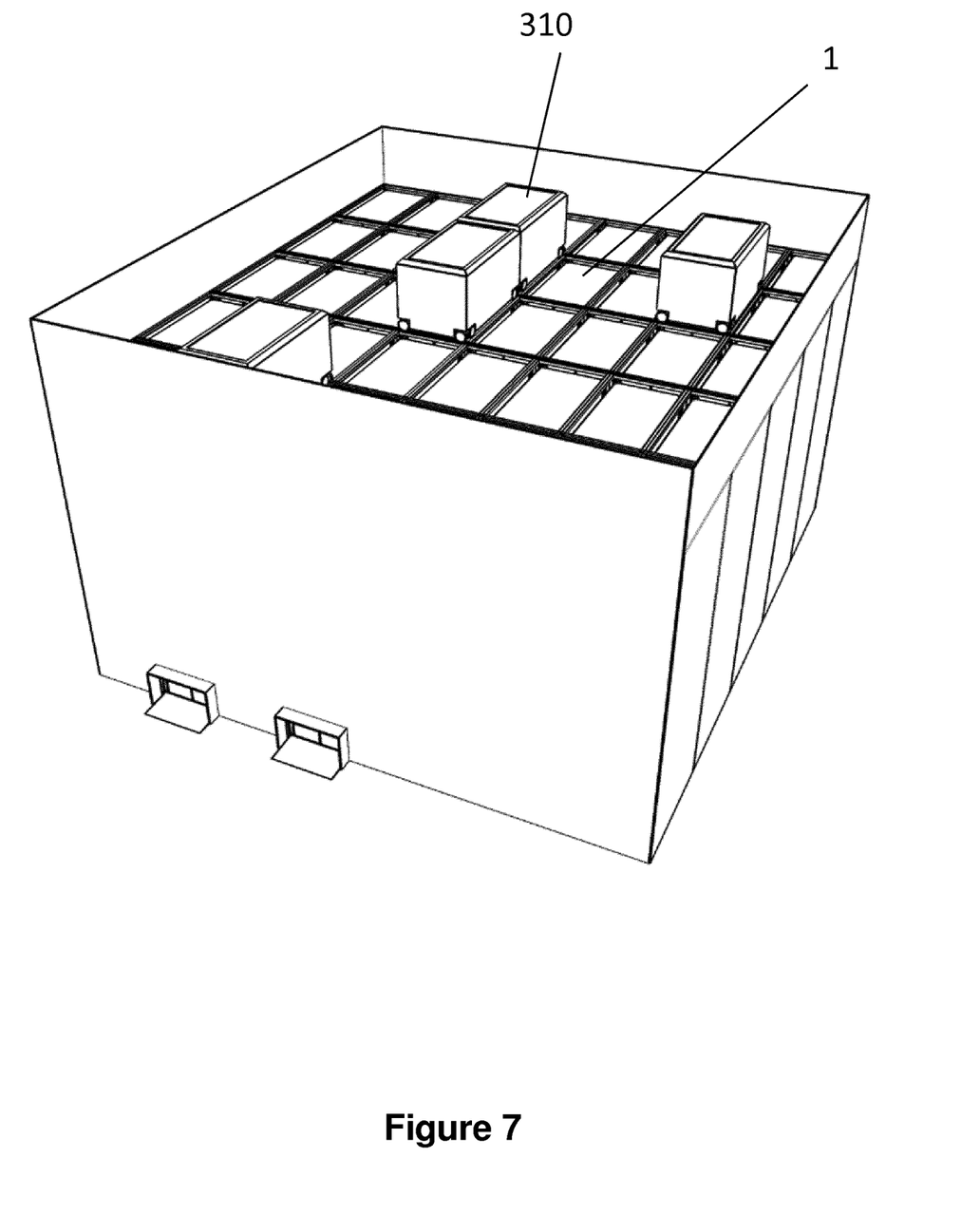
FIG. 7 shows a schematic perspective view of one form of robotic self-storage system in accordance with a further form of the invention, the system comprising containers of FIG. 6.

It will be appreciated that in all the examples described above, fixtures and fittings that are not fixedly attached to the container property or room would need to be removed prior to movement of the container. In a further embodiment of the invention as shown in FIG. 4, a storage system is envisaged that may be located adjacent the reconfigurable building as shown in FIG. 5. The storage system is of a similar format to that described above with reference to the container properties and rooms but the containers 1 and load handling devices are of a smaller size.

It will be appreciated that items requiring storage would be removed from the container rooms or properties 1 and placed in to storage containers 1. The storage containers 1 would be located in stacks as described above within a framework of uprights. The uprights support a grid comprising two sets of perpendicular rails, a plurality of load handling devices operable on the rails above the stacks.

In use, the items to be stored are placed in to stackable containers 1. The containers 1 may be loaded manually or robotically or via vehicles such as fork lift trucks at loading stations within the grid. At the loading stations, robotic load handling devices collect the containers 1 and put them in to the storage system in one of the stacks.

In this way, items that cannot be secured in the container properties 40 or rooms may be stored in proximity to the modular building awaiting use.

It will be appreciated that the items to be stored may comprise items closely associated with the function of the modular building. For example, if the modular building is a hospital with reconfigurable wards, operating theatres and clean rooms it will be appreciated that if more operating theatres are required and placed in to the modular building, there may be a requirement for additional equipment associate with performing additional operations. This may include additional trolleys or operating tables or lamps that can be stored on site in a modular storage system and accessed via load handling devices as and when required. If patient wards have been removed there may be a surplus of beds that require storage. These may be stored in stacked containers within stacks in such a mechanised storage system accessible via the load handling devices as and when required.

In the case of a hospital, it will be appreciated that a modular storage system may be used as a morgue, each of the containers comprising a location for storage. It will be appreciated in this example that the container may require a deoxygenated, or nitrogen rich, or chilled environment. In this case, the required services would be routed via the uprights of the framework and the grid.

In another example associated with a hospital modular building, a mechanised container storage system may be used for pharmaceuticals, drugs, bandages, and other medical equipment.

If the modular building is a residential apartment block it will be appreciated that an associated storage system may be required to store furniture not required by the current configuration but that may be required at short notice should the building require reconfiguration.

Furthermore, a storage system suitable for storing vehicles such as cars, vans, bicycles, scooters or any other form of vehicle could be located in a position associated with the residential apartment modular building such that occupiers may easily access their vehicles as required.

If the modular building is a commercial building such as a shopping centre or mall then the co-located modular storage system may comprise means for storing goods to be sold in the shopping centre. These may comprise small items to be stored in bulk that may be stored in small or micro versions of the modular mechanised storage system.

If the modular building comprises a library container rooms, books, journals or magazines may be located within an associated storage facility operating in the same manner.

It will be appreciated that any number of uses for such a storage system could be envisaged and the uses are not limited to those described above.

Any size of item may be stored in such a storage system, and the containers 1 and load handling devices may be sized to fit the items to be stored.

It will further be appreciated that a purpose built self-storage depot may be envisaged configured in the manner described above. In this embodiment of the invention a user may purchase or rent one or more container within the storage system and access their container via a suitable access code. When the user requires access to their storage container, the access code is entered at an appropriate code entry device and load handling devices co-operate in as efficient manner as possible and remove the required container from the stack in which it is stored and transport the container to an access point at which the user can access their storage container as required. It will be appreciated that this self-storage solution provides a more efficiently packed system as corridors and access points can be reduced in size and quantity.

In all of the examples above, it is a requirement that the location of the item being stored, whether a container property or an item such as a book or a bicycle, is known and traceable in order to facilitate the removal of the item from the modular building or storage system. The storage system further comprises a control system, the control system comprising identifying means, monitoring means and locating means, the identifying means identifying a container to be located in the system, monitoring means, for associating a given container having a specific function or content with a given location within the storage system or building, and locating means for locating the container 1 within the stack 110 to enable a load handling device 310 to retrieve a given container 1 on demand.

It will be appreciated that a robotic storage system as described may be used to store any item or items capable of storage in a container and the items to be stored are not limited to those described above.

Furthermore, the items to be stored need not be co-located with the reconfigurable building described above but may be located completely independently of such a building.

It will be appreciated that the container properties and rooms described above need not be limited to the functions described and that any other suitable function may be envisaged. The functions described are examples only.

It will be appreciated that services will need to be supplied via the framework and uprights and these services are not limited to those described but may include other services governed by the use of the building, property or room.

The invention claimed is:

1. A reconfigurable modular building system, comprising:
a plurality of containers, the containers being disposed in stacks within a framework structure forming a support structure of the modular building system, the framework structure including:
a series of substantially vertical uprights having a substantially horizontal grid mounted thereon, the grid including two substantially perpendicular sets of rails on which at least one load handling device is operable, the load handling device including a body mounted on wheels, a first set of wheels are arranged to engage with at least two rails of a first set of the rails, the second set of wheels are arranged to engage with at least two rails of a second set of the rails, the first set of wheels are independently moveable and driveable with respect to the second set of wheels such that when in motion only one set of wheels is engaged with the grid at any one time thereby enabling movement of the load handling device along the rails to any point on the grid by driving only the set of wheels engaged with the rails, the containers are configured with an interior structure adapted to perform specific functions, the specific functions are selected from a plurality of available functions, each stack including containers of any number of different selected functions, the stack is adapted to be reconfigurable on demand to include containers of alternative functions, the containers in the stacks are arranged such that each container supports the container immediately above in the stack.

2. A modular building system according to claim 1, wherein the interior functions of the containers include:
areas having functions which include at least one of hospital wards, living rooms, recreation rooms, gymnasiums, bedrooms, shops, bathrooms, lecture theatres, operating theatres, clean rooms, garages, storage rooms, entire properties, offices, or holiday homes.

3. A modular building system according to claim 1, in which the containers include configurations and facilities in multiple arrangements as selected by users of the system.

4. A modular building system according to claim 1, in which supports form corners of the containers, each container supporting the container above, the supports are load bearing members of the building structure.

5. A modular building system according to claim 1, comprising:
plural load handling devices, at least one of the load handling devices being are sized so as to accommodate a living accommodation.

6. A modular building system according to claim 1, comprising:
a control system, the control system including identifying means, monitoring means and locating means, the identifying means identifying a container to be located in the building, monitoring means for associating a given container having a specific function with a given location within the building, and locating means for locating a container within the stack to enable a load handling device to retrieve a given container on demand.

7. A modular building system according to claim 1, comprising:
a building reconfigurable by rearranging an order in which the containers are located within the stacks.

8. A modular building system according to claim 1, in which the framework structure comprises:
means for supplying services to the containers, said services including at least power and water.

9. A modular building system according to claim 1, in which the containers comprise:
shipping containers of predetermined and standard sizes.

10. A method of reconfiguring a building, comprising:
providing a plurality of containers each having an interior defined by a predetermined function;
stacking the plurality of containers within a framework forming a support structure of the building;
providing a robotic load handling device on a grid above the stacks of the plurality of containers; and
moving or removing the containers, a reconfiguration of the building occurring as a result of moving the containers having different functions to different locations within the building or to different buildings.

11. A method according to claim 10, comprising:
removing a container from a stack and replacing the container with a container having a different interior function.

12. A method according to claim 10, comprising:
removing a container from a stack with the load handling device, the load handling device moving the container and depositing it on a vehicle for onward transportation to a location remote from a first building.

* * * * *